United States Patent [19]
Klein Gunnewiek et al.

[11] Patent Number: 5,606,371
[45] Date of Patent: Feb. 25, 1997

[54] VIDEO SIGNAL CODING WITH PROPORTIONALLY INTEGRATING QUANTIZATION CONTROL

[75] Inventors: Reinier B. M. Klein Gunnewiek, Eindhoven, Netherlands; Imran A. Shah, Ossining, N.Y.; Gerrit J. Keesman, Eindhoven, Netherlands

[73] Assignee: U.S. Philips Corporation, New York, N.Y.

[21] Appl. No.: 346,948

[22] Filed: Nov. 29, 1994

[30] Foreign Application Priority Data

Nov. 30, 1993 [BE] Belgium ................. 09301320

[51] Int. Cl.⁶ ..................................................... H04N 7/30
[52] U.S. Cl. .......................................................... 348/405
[58] Field of Search ..................... 348/405, 419, 348/390, 384; 382/251

[56] References Cited

U.S. PATENT DOCUMENTS

| | | | |
|---|---|---|---|
| 5,038,209 | 8/1991 | Hang .......................... | 348/405 |
| 5,214,507 | 5/1993 | Aravind et al. ............. | 348/415 |
| 5,231,484 | 7/1993 | Gonzales et al. . | |
| 5,291,281 | 3/1994 | Paik et al. . | |
| 5,396,567 | 3/1995 | Jass ........................... | 348/405 |

FOREIGN PATENT DOCUMENTS

| | | |
|---|---|---|
| 0540961 | 10/1992 | European Pat. Off. . |
| 0541302 | 10/1992 | European Pat. Off. . |
| 0540961A2 | 10/1992 | European Pat. Off. . |
| 0541302A2 | 10/1992 | European Pat. Off. . |

OTHER PUBLICATIONS

MPEG 2 Test Model 5, ISO/IEC JTC1/SC29/WG11/N0400, Apr. 1993.
Herbert Holzlwimmer, Walter Tangler, Achim V. Brandt; "A New Hybrid Coding Technique for Videoconference Applications at 2 MBIT/S" SPIE vol. 594 Image Coding (1985) pp. 250–259.
"Hardware Implementation of the Framestore and Datarate Control for a Digital HDTV–VCR", a discourse held at the HDTV Symposium, in Japan, Nov. 1992.
"Coding of moving pictures and associated audio for digital storage media up to about 1.5 Mbit/s", ISO/IEC IS 11172.
"A New Hybrid Coding Technique for Videoconference Applications at 2 Mbit/s" SPIE vol. 594 Image Coding (1985).

*Primary Examiner*—Tommy P. Chin
*Assistant Examiner*—Bryan S. Tung
*Attorney, Agent, or Firm*—Laurie E. Gathman

[57] ABSTRACT

A device for encoding a video signal comprises a picture transformer (22), a quantizer (23) and a variable-length encoder (24), as well as distribution device (6) for distributing a global target value (T) for the number of bits per picture or group of pictures in local target values ($T_n$) for separate macroblocks of each picture. The device for encoding is provided with proportionally integrating control device for for controlling the quantization step size ($Q_1$) in such a way that the buffer contents (b) of an output buffer (4) are in conformity with the target value. Since the PI control circuit does not introduce any residual errors, the desired number of bits per picture or group of pictures is achieved within narrow limits. The output signal is eminently suitable for recording and subsequent editing.

6 Claims, 3 Drawing Sheets

VIDEO SIGNAL CODING WITH PROPORTIONALLY INTEGRATING QUANTIZATION CONTROL

The invention relates to a device for encoding a video signal, comprising: means for dividing each picture into a plurality of sub-pictures, an encoder comprising a picture transformer for transforming each sub-picture into coefficients, and a quantizer for quantizing the coefficients with an applied step size. The device also comprises distribution means for distributing a target value for the number of bits for encoding an applied picture in a plurality of local target values for the separate sub-pictures, and control means for controlling the step size in conformity with the local target values.

A device of the type described in the opening paragraph is known from "Hardware Implementation of the Framestore and Datarate Control for a Digital HDTV-VCR", a discourse held at the HDTV Symposium, in Japan, November 1992. However, the publication does not describe in which way the step size is controlled in order to achieve a fixed number of bits per picture.

The known device relates to intraframe encoding of video signals. Intraframe encoding is understood to mean that each picture is encoded individually, independently of other pictures. Devices referred to as MPEG are known, with which one picture from a group of pictures (GOP) are intraframe-encoded. Such a picture is referred to as I picture. Other pictures are subjected to predictive motion-compensated (interframe) encoding. In forward prediction the term P pictures is sometimes used, while in bidirectional prediction the term B pictures is sometimes used. Such an MPEG device is described, inter alia in "Coding of moving pictures and associated audio for digital storage media up to about 1.5 Mbit/s", ISO/IEC IS 11172. In MPEG encoding the number of bits per picture is very much dependent on the type of encoding to which it is subjected. A frequently occurring division of a GOP is, for example the series "IBBPBBPBBPBB". Known MPEG encoders produce a bit stream in which the number of bits per GOP fluctuates considerably. With a view to later editing and display at different speeds, an MPEG bit stream is therefore unsuitable for recording.

It is an object of the invention to provide control means with which a fixed number of bits per picture or group of pictures is obtained within narrow limits.

To this end, the device according to the invention comprises means for forming a control signal to be applied to the control means, which control signal is representative of the difference between successively accumulated local target values and the number of bits produced by the encoder. The control means are constituted by a proportionally integrating control circuit. The invention is based on the recognition that a proportionally integrating control circuit does not introduce static residual errors. Hence, the device supplies per picture, and per group of pictures when an MPEG encoder is used, a number of bits which is constant within narrow limits.

The control circuit comprises a proportional control branch having a first control factor and an integrating control branch having a second control factor. A first and second fraction, respectively, of the step size is thereby obtained. The sum of both fractions constitutes the step size for supply to the encoder. If desired, both control factors may be constants. They are then dimensioned in such a way that the control loop remains stable, even when the most complex pictures occur. A favourable preferred embodiment of the device is, however, obtained if the control factors are controlled in proportion to the quotient of the average step size with which a plurality of sub-pictures is quantized and the number of bits produced by the encoder for said plurality of sub-pictures. In that case, the stability of the control loop appears to be independent of picture type and picture contents.

A further embodiment of the device comprises an additional encoder for encoding the applied picture in response to a fixed step size, and computing means for computing the target value from the picture thus encoded. If an MPEG encoder is used, the computing means may be adapted to compute the target value in dependence upon the type of (I,P,B) picture. It is thereby achieved that the fluctuations in the number of bits per picture, or per GOP, are considerably smaller because the complexity of the current picture is now taken into account for computing the target value. This will be appreciated, if it is considered that the target value in the known MPEG encoders is fixed with reference to the previous picture of the same type. However, the previous I picture is generally situated 12 pictures back in time and may have a completely different complexity.

The distribution means for dividing the target value for the picture into a plurality of target values for each sub-picture may have different forms. A possible form comprises, for example, a proportional distribution of the target value among all sub-pictures. In this way the number of available bits is uniformly spread across the picture. A favourable embodiment of the device is obtained if the distribution means are adapted to distribute the target value in proportion to the number of bits generated for the sub-pictures by the additional encoder. In this way a profile is obtained of the need of bits for the sub-pictures. For example, a picture comprising, from top to bottom, a clear blue sky, terrace houses and a very detailed flowerbed, can be optimally encoded because the distribution circuit "foresees" that more bits are spent on sub-pictures as they are more detailed and more difficult to encode. Thus, a uniform distribution of picture quality in a picture is obtained.

The bit stream produced by the device not only comprises coefficient data but also quantization-independent information. The MPEG syntax comprises, inter alia, motion vectors of a block and control bits indicating whether a bit series is produced by intraframe or interframe encoding of the block. For some sub-pictures, the bits required for this "overhead" may constitute a considerable fraction of the number of bits with which this sub-picture is transmitted. To prevent the target value for a sub-picture from being spent to a considerable extent on overhead bits, the distribution means in a further embodiment are adapted to distribute the target value among the sub-pictures in proportion to the number of quantization-dependent bits generated for these sub-pictures by the additional encoder. In this way an even better distribution of picture quality in a picture is obtained.

These and other aspects of the invention will be apparent from and elucidated with reference to the embodiments described hereinafter.

In the drawings

Figure 1:
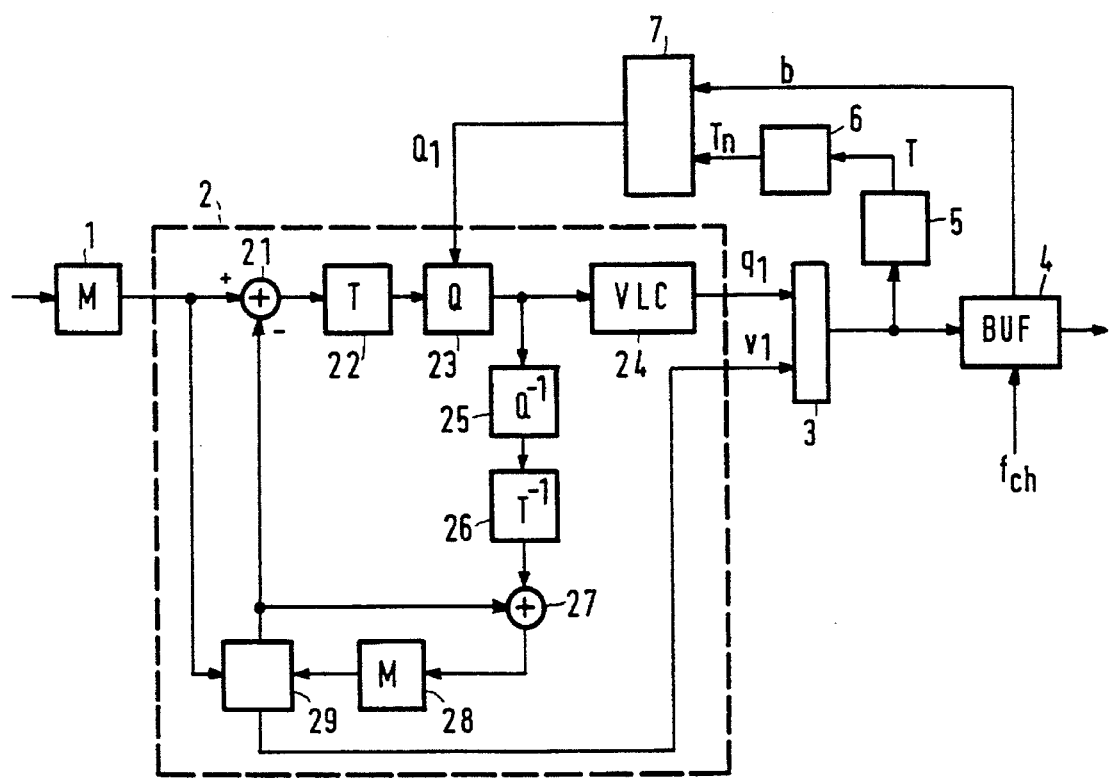
FIG. 1 shows a device for encoding a video signal according to the invention.

FIG. 1 shows a device for encoding a video signal according to the invention. The device comprises a memory 1 in which each picture is split into blocks of, for example 8*8 pixels. A predetermined number of contiguous blocks, for example four blocks of 8*8 luminance samples and two blocks of 8*8 chrominance samples, constitute a sub-picture. In conformity with the conventional MPEG syntax, such a sub-picture will hereinafter also be referred to as macroblock.

The blocks of 8*8 samples are applied to an encoder 2. This encoder comprises a subtracter circuit 21, a picture transformer 22 for transforming each block into 8*8 coefficients, a quantizer 23 for quantizing the coefficients with a step size $Q_1$ and a variable-length encoder 24 for encoding the quantized coefficients into code words of variable length. The encoder further comprises a prediction loop for forming a motion-compensated prediction picture. This loop comprises an inverse quantizer 25, an inverse picture transformer 26, an adder circuit 27, a picture memory 28 and a motion estimator 29.

It is to be noted that not every coefficient of a block is necessarily quantized with the same step size. The quantization step may also depend on the spatial frequency represented by a coefficient. In that case, the expression "step size" is understood to mean a parameter fixing the distinct quantization steps for a block of coefficients.

The obtained series of code words of variable length constitutes a quantization-dependent bit stream $q_1$ of coefficient bits. This bit stream is combined in a multiplexer 3 with other information which is formed, inter alia by motion vectors produced by motion estimator 29. The other information will hereinafter be referred to as "overhead" and is denoted by $v_1$ in the Figure. The combined bit stream is applied to a buffer 4 from which it is read at a channel bitrate $f_{ch}$.

The device has hitherto constituted a known MPEG encoder as described in the afore-mentioned document "Coding of moving pictures and associated audio for digital storage media up to about 1.5 Mbit/s". The video signal is transmitted in the form of groups of pictures (GOPs). Each GOP comprises at least one intraframeencoded picture (I picture), a number of predictively encoded pictures (P pictures) and a number of bidirectionally predictively encoded pictures (B pictures). When encoding I pictures, the subtracter 21 is not active and each block of pixels is encoded individually. For P and B pictures, the motion estimator 29 supplies a prediction block and a difference block is encoded. If there is insufficient conformity between a block of the supplied picture and its ambience in prediction picture memory 28 (i.e. when there is too much motion), blocks of P and B pictures may also be subjected to intraframe encoding. Information with respect to the applied encoding mode of a block is also accommodated in the overhead information $v_1$.

The device further comprises a computing circuit 5 for computing a target value T for the number of bits for encoding the applied picture. This target value for a picture to be encoded will hereinafter be referred to as "global target value". In the MPEG encoder (in which both intraframe and interframe encoding is performed), the computation of the target value is dependent on the type of (I, P, B) picture. The computations to be carried out are described in chapter 10 of "MPEG 2 Test Model 5", ISO/IEC JTC1/SC29/WG11/N0400, April 1993. Embodiments of the computing circuit 5 can be derived therefrom by those skilled in the art. If the encoder is of a type which is adapted for intraframe encoding only, T has a predetermined constant value (i.e. the desired number of bits per picture) and the computing circuit is actually superfluous.

In a distribution circuit 6, the target value T for the picture is divided into "local target values" $T_n$ for the separate sub-pictures. It will initially be assumed that the distribution circuit 6 is adapted to distribute the target value T for the picture evenly among all N macroblocks. In that case it holds that:

$$T_n = \frac{T}{N}$$

Figure 2:
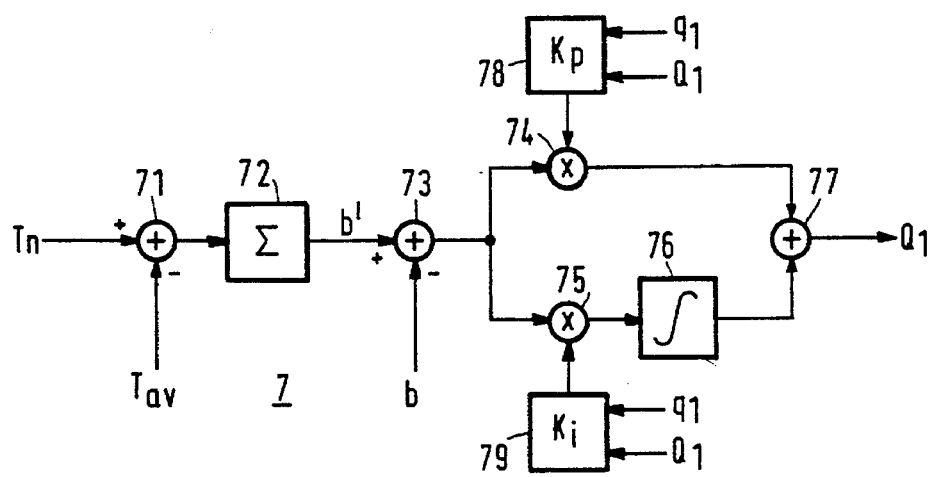
FIG. 2 shows an embodiment of a control circuit shown in FIG. 1.

The local target values $T_n$ thus obtained and a signal b representing the fullness of buffer 4 are applied to the control circuit 7. FIG. 2 shows a possible embodiment of this control circuit. It comprises a subtracter 71 which determines, for each macroblock, the difference between the local target value $T_n$ and a desired average value $T_{av}$. $T_{av}$ has a fixed value which directly follows from the number of bits R per GOP, the number of pictures in a GOP and the number of macroblocks per picture. The obtained difference is accumulated by means of a counter 72. The output signal of the counter 72 forms, as it were a desired buffer fullness b' (in number of bits) of the output buffer 4 (see FIG. 1) of the device. The control circuit further comprises a subtracter 73 in which the desired buffer fullness b' is compared with the actual buffer fullness b of the buffer. The difference between the two numbers of bits constitutes a control signal. Said control signal is multiplied by a first multiplier 74 by a control factor $K_p$ and by a second multiplier 75 by a control factor $K_i$. The output of the second multiplier 75 is applied to an integrator 76. An adder 77 adds the outputs of multiplier 74 and integrator 76.

The elements 74-77 of the control circuit shown in FIG. 2 constitute a proportionally integrating (PI) controller which controls the step size $Q_1$ for supply to encoder 2 (see FIG. 1) without producing a residue in the control signal. Tests have proved that the desired number of bits R for each COP can be achieved with the device within an accuracy of 0.03%. The output signal of the device is therefore eminently suitable for storage, allowing the facility of later editing.

Figure 3:
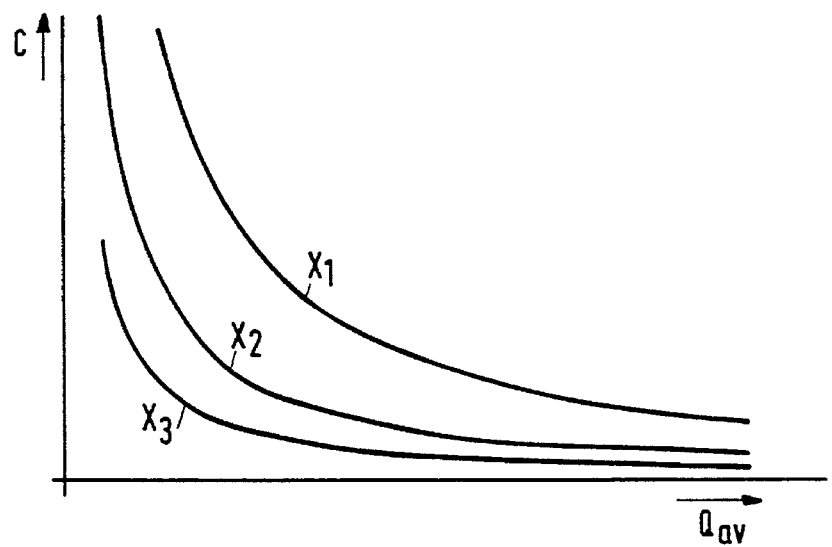
FIG. 3 shows a diagram to explain the operation of the control circuit shown in FIG. 2.

The control factors $K_p$, and $K_i$ may be constants. An MPEG encoder may, however, be considered as a process having a non-constant gain. To explain this, FIG. 3 shows the relation between the number of coefficient bits C and the average step size Q for three different pictures of complexity X=C.Q. The derivative dC/dQ is a measure of the gain of the MPEG encoder. More particularly, the gain of an encoder can be defined as:

$$G = \frac{dC}{dQ} = \frac{-X}{Q^2} = \frac{-C}{Q}$$

As is apparent from the Figure, the gain does not only depend on the complexity X (hence on the picture contents) but also on the step size Q. Constant control factors $K_p$ and $K_i$ are to be dimensioned in such a way that there is no instability of the control process, even for the most complicated signals.

The control process is stable under all circumstances when variations in gain are compensated by inverse variations in the control factors, in other words, when the product of control factor and gain is constant. Hence, favourable control factors $K_p$ and $K_i$ are constituted by:

$$K_p = \frac{-c_p}{G} = \frac{c_p \cdot Q}{C} \text{ and } K_i = \frac{-c_i}{G} = \frac{c_i \cdot Q}{C}$$

in which $c_p$ and $c_i$ are appropriate constants. The elements denoted by 78 and 79 in FIG. 2 are adapted to generate the control factors $K_p$ and $K_i$, respectively, in conformity therewith. To this end, they receive the bit stream $q_1$ from the encoder (for deriving the number of produced bits therefrom) as well as the step size $Q_1$.

Figure 4:
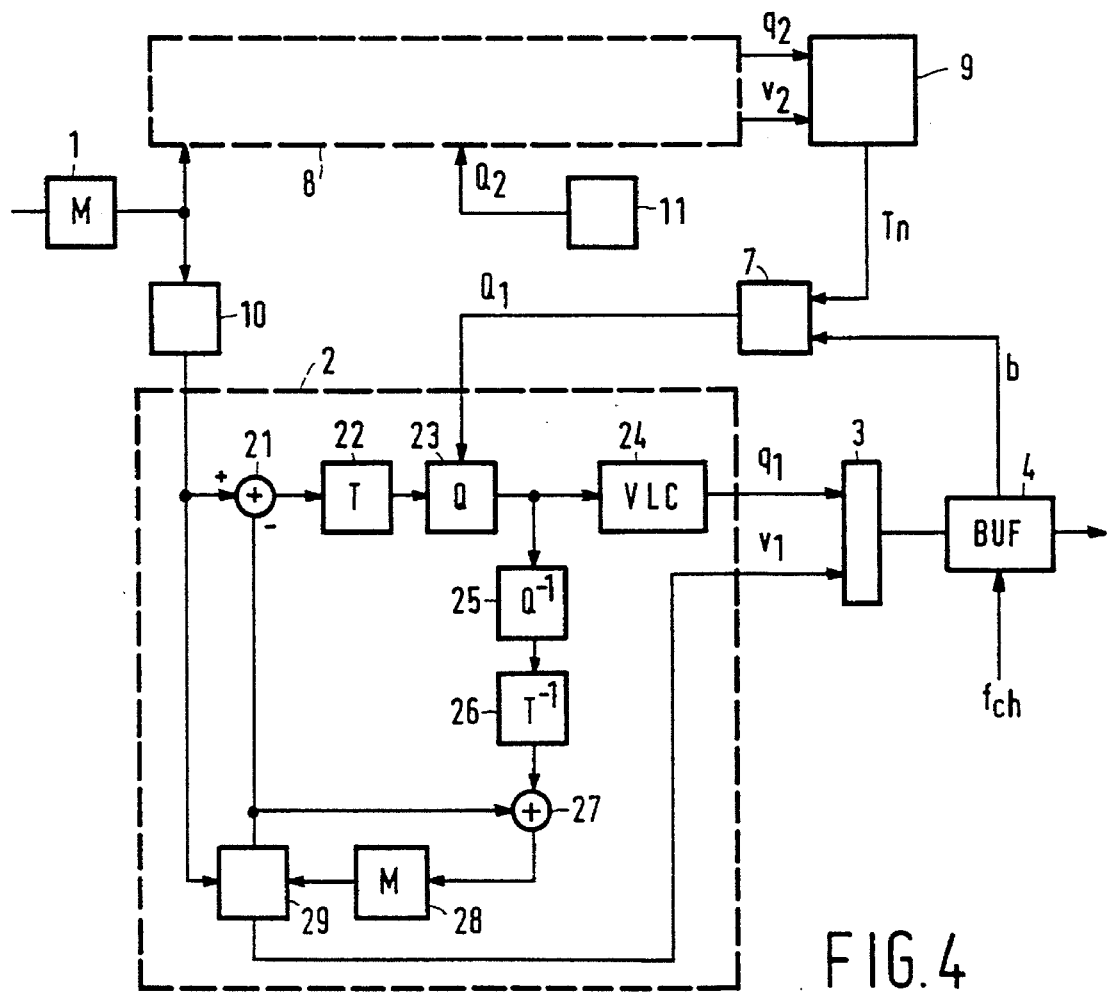
FIG. 4 shows a further embodiment of the device for encoding a video signal.

The device shown in FIG. 1 has the drawback that the global target value is derived from the complexity of the previous picture of the same type (I, P, B). Such a previous picture may be situated fax back in time and have a completely different complexity. FIG. 4 shows an embodiment of the device in which the most current global target value is determined. Identical reference numerals represent the same functions as in FIG. 1. The device now comprises an additional encoder 8 and a computing circuit 9 coupled thereto for computing the global target value T. The additional encoder 8 will hereinafter also be referred to as preanalyser. It forms a quantization-dependent bit stream $q_2$ and overhead information $v_2$. The preanalyser may have different forms. It will hereinafter be assumed to be an MPEG encoder without bitrate control. The preanalyser is then of the same type as encoder 2 and therefore it is not shown in greater detail. It receives a quantization step size $Q_2$ from a step size determining circuit 11 which will be described hereinafter. However, it should already be noted that the step size $Q_2$ is invariable during a picture but may be different from picture to picture.

Figure 5:
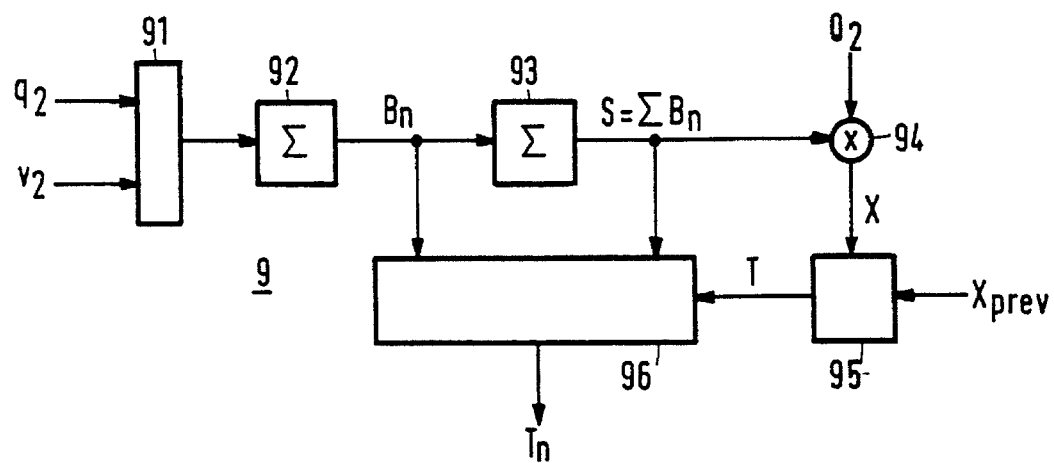
FIGS. 5 and 6 show embodiments of a computing circuit shown in FIG. 3.

FIG. 5 shows diagrammatically an embodiment of the computing circuit 9. It comprises a multiplexer 91 for combining the coefficient bit stream $q_2$ and the overhead bit stream $v_2$ which is produced by the preanalyser. The combined bit stream is applied to a counter 92 which counts the number of bits $B_n$ generated by the preanalyser for subpicture n of the picture. A further counter 93 counts the total number of bits $S = \Sigma B_n$ which is spent on the entire picture. S is multiplied by the step size $Q_2$ in a multiplier 94. The product is a complexity value X which is representative of the complexity of the applied picture. Said complexity value is separately determined for each type of picture (I, P, B). Expressed in a formula:

$$X_I = S_I \times Q_{2I}, X_P = S_P \times Q_{2P} \text{ and } X_B = S_B \times Q_{2B} \quad (1)$$

The complexity value is applied to the computing circuit 95 for computing the target value T for the number of bits for encoding the relevant picture. The following considerations apply with respect to the computations performed by the computing circuit:

(A) A total number of bits R is available for a GOP comprising $N_I$ pictures of the type I, $N_p$ pictures of the type P and $N_B$ pictures of the type B. The aim is to distribute the global target values $T_I$, $T_p$, $T_B$ for each type of picture in such a way that:

$$R = N_I T_I + N_P \cdot T_P + N_B \cdot T_B \quad (2)$$

is satisfied.

(B) It is assumed that the different encoding types (I, P, B) lead to an equal picture quality if the corresponding step sizes $Q_I$, $Q_P$ and $Q_B$ are in a given ratio:

$$Q_P = K_P \cdot Q_I \text{ and } Q_B = K_b \cdot Q_I \quad (3)$$

The relation between the number of bits $S_P$, $S_B$ obtained in P and B encoding of a picture and the number of bits $S_I$ obtained in I encoding of this picture can be derived from (1) and (3):

$$S_P = \frac{X_P}{k_p \cdot X_I} S_I \text{ and } S_B = \frac{X_B}{k_b \cdot X_I} S_I$$

(C) The same relation is assumed to be applicable to the global target values for the different types of pictures:

$$T_P = \frac{X_P}{k_p \cdot X_I} T_I \text{ and } T_B = \frac{X_B}{k_b \cdot X_I} T_I \quad (4)$$

The following formula for the global target value $T_I$ for an I picture can be derived from (2) and (4):

$$T_I = \frac{R}{N_I + \frac{N_P \cdot N_P}{k_p \cdot X_I} + \frac{N_B \cdot X_B}{k_b \cdot X_I}} \quad (5)$$

(D) After the global target value $T_I$ for the last (or only) I picture of the GOP is fixed and the picture is encoded as much as possible in conformity therewith, the target values for the other P and B pictures may be adapted, if desired, to the remaining number of bits available for the COP. In that case, equation (2) changes to:

$$R_I = n_P \cdot T_P + n_B \cdot T_B$$

in which $n_P$ and $n_B$ represent the number of P and B pictures still to be encoded in the GOP and $R_1$ represents the number of bits which is still available. The following formulas can now be derived for the target values $T_P$, and $T_B$:

$$T_P = \frac{R_I}{n_P + \frac{n_B \cdot k_p \cdot X_B}{k_b \cdot X_P}} \text{ and } T_B = \frac{k_p \cdot X_B \cdot T_P}{k_b \cdot X_P} \quad (6)$$

The global target value of a picture is computed by the computing circuit before the relevant picture is applied via a picture delay 10 to encoder 2 (see FIG. 4) for actual encoding. The computation is effected as follows:

(I) During encoding of an I picture, the computing circuit receives the complexity value $X_1$ of this picture from multiplier 94. The target value $T_I$ t is computed by means of equation (5). The complexity values $X_P$ and $X_B$ in this equation are formed by previously computed complexity values of the most recent previous P or B picture. These previously computed complexity values are denoted by $X_{prev}$ in FIG. 5. They are stored in a memory (not shown) upon encoding of the previous picture.

(P) During encoding of a P picture, computing circuit 95 receives the complexity value $X_P$, of this picture from multiplier 94. The target value $T_P$, is computed by means of equation (4) or, if the GOP no longer comprises any further I pictures, by means of equation (6). The complexity values other than $X_P$ are again formed by the previously computed complexity values of the most recent previous picture of the relevant type.

(B) During encoding of a B picture, computing circuit 95 receives the complexity value $X_B$ of this picture from multiplier 94. The target value $T_B$ a is computed by means of equation (4) or (6).

Subsequently, the distribution circuit 96 distributes the global target value T among the macroblocks of the picture in proportion to the number of bits $B_n$ produced by the preanalyser for these macroblocks. To this end, the distribution circuit computes for each macroblock n the local target value $T_n$ in conformity with:

$$T_n = \frac{B_n}{\Sigma B_n} \times T \qquad (7)$$

For each macroblock, the local target value $T_n$ is thus in conformity with the relative complexity of this macroblock. In combination with the residue-less control circuit for realising these target values, it is, as it were, "foreseen" that more bits are spent on a sub-picture as this sub-picture is more detailed. Thus, a uniform picture quality throughout the picture is achieved at a constant number of bits per GOP.

Figure 6:
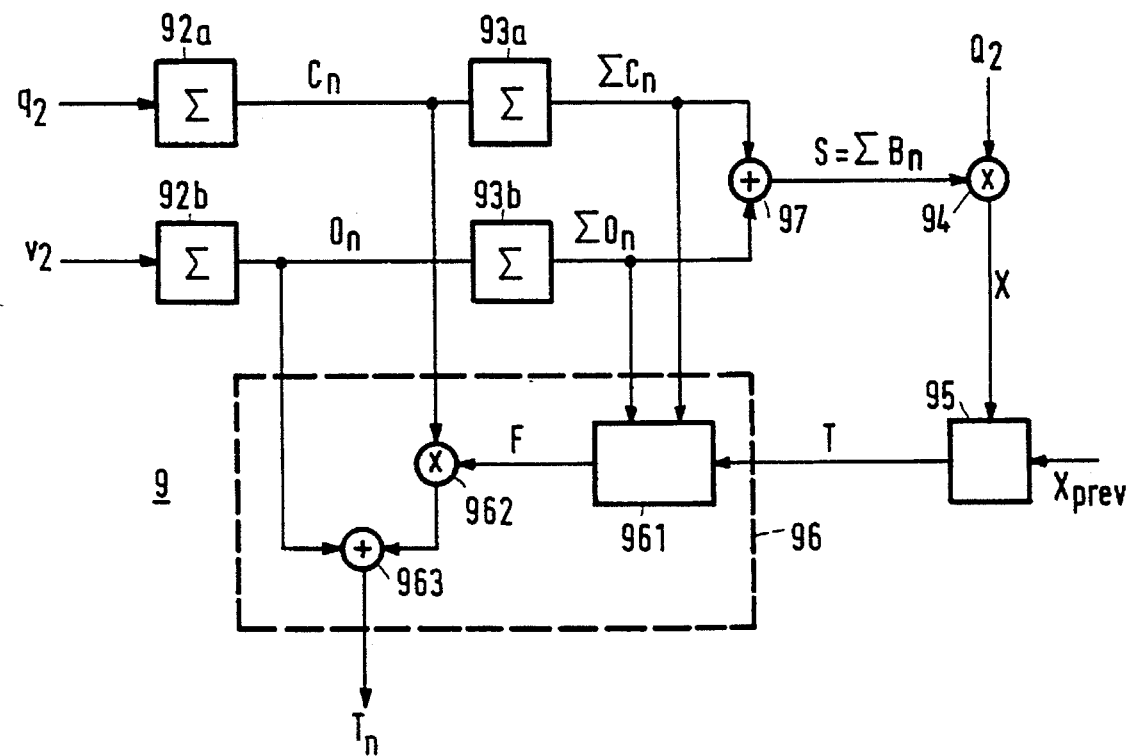

FIG. 6 shows a further embodiment of the computing circuit 9. In this embodiment, the number of coefficient bits and the number of overhead bits of the preanalyser is separately counted for each macroblock n. To this end, the computing circuit comprises separate counters 92a and 92b for counting, macroblock by macroblock, the number of coefficient bits $C_n$ in the quantization-dependent bit stream $q_2$ and the number of bits On in the overhead data $v_2$. Further counters 93a and 93b count the number of bits $\Sigma C_n$ and $\Sigma O_n$ throughout the picture. An adder 97 sums both numbers so that the total number of bits $S=\Sigma B_n$ is obtained again, which is spent by the preanalyser on the entire picture. In the manner already described with reference to FIG. 5, multiplier 94 fixes the complexity value X of the applied picture and computing circuit 95 computes the global target value for the picture.

The distribution circuit 96 now has a different structure than that in FIG. 5. It comprises a scaling circuit 961 fixing a scale factor F in conformity with the following formula:

$$F = \frac{T - \Sigma O_n}{\Sigma C_n}$$

The local target value $T_n$ is subsequently obtained by multiplying, for each macroblock n the number of coefficient bits $C_n$ by the scale factor F (multiplier 962) and adding the number of overhead bits $O_n$ thereto (adder 963). In other words, in this embodiment, the local target value $T_n$ for each macroblock is determined by the formula:

$$T_n = F \times C_n + O_n \qquad (8)$$

The target value in accordance with equation (8) is more suitable than that in accordance with equation (7) because it is then avoided that too many bits of a macroblock are spent on overhead data. This will be elucidated by way of an example. In this greatly simplified example, a picture comprises two macroblocks. The global target value for the complete picture is T=250 bits. The preanalyser has produced 500 bits for the picture in the following way:

|  | coefficient bits | overhead bits |
| --- | --- | --- |
| macroblock 1 | 325 | 75 |
| macroblock 2 | 50 | 50 |

In the embodiment of FIG. 5, the local target values $T_1=200$ and $T_2=50$ are obtained in conformity with equation (7). Based on the (real) assumption that the encoder produces as many overhead bits as the preanalyser, this results in:

|  | coefficient bits | overhead bits |
| --- | --- | --- |
| macroblock 1 | 125 | 75 |
| macroblock 2 | 0 | 50 |

In the embodiment of FIG. 6, the local target values $T_1=183$ and $T_2=67$ are obtained in conformity with equation (8) (in which F=0.33). The encoder now produces:

|  | coefficient bits | overhead bits |
| --- | --- | --- |
| macroblock 1 | 108 | 75 |
| macroblock 2 | 17 | 50 |

The distribution of the global target value among the macroblocks in accordance with the embodiment shown in FIG. 6 thus yields a more uniform picture quality than the embodiment shown in FIG. 5.

The device according to the invention provides the possibility of controlling the buffer contents of the buffer 4 (see FIGS. 1 and 4) in such a way that it maintains a predetermined value within narrow limits. It is particularly possible to keep the buffer substantially filled. It is thereby achieved that the complementary input buffer of a receiver is accordingly empty. This will be greatly appreciated, considering that a receiver can now decode the received bit stream already when the corresponding empty buffer contents are reached. In other words, the waiting time at the receiver end when switching from one bit stream to the other is limited. The known MPEG encoder does not have this advantage because its slow bitrate control with a substantially full buffer frequently gives rise to unwanted panic modes in which buffer overflow is avoided by refraining altogether from the transfer of coefficients.

We claim:

1. A device for encoding a video signal, comprising:

means for dividing each of a plurality of pictures into a plurality of sub-pictures;

an encoder comprising a picture transformer for transforming each sub-picture into coefficients, and a quantizer for quantizing the coefficients with an applied step size;

control means for controlling the step size in response to a control signal which is representative of the difference between a target value for the number of bits to be produced by the encoder and the number of bits produced by the encoder, the control means including a proportionally integrating control circuit having a proportional control branch having a first control factor for determining a first fraction of the step size and an integrating control branch having a second control factor for determining a second fraction of the step size;

at least one of said first and second control factors being controlled in proportion to the quotient of the average step size with which a plurality of sub-pictures is quantized and the number of bits produced by the encoder for said plurality of sub-pictures.

2. A device as claimed in claim 1, further including an additional encoder for encoding an applied picture and distribution means for distributing the target value for a picture in a plurality of local target values for each sub-picture, the distribution means being adapted to distribute the target value in proportion to the number of bits generated by the additional encoder for each sub-picture.

3. A device as claimed in claim 2, wherein a series of quantization-dependent bits and a series of quantization-independent bits are formed for each sub-picture, and wherein the distribution means are adapted to distribute the target value among the sub-pictures in proportion to the number of quantization-dependent bits generated for said sub-pictures by the additional encoder.

4. A method of encoding a video signal, comprising the steps of:

dividing each of a plurality of pictures into a plurality of sub-pictures;

encoding each picture by transforming each sub-picture into coefficients and quantizing the coefficients with an applied step size;

controlling the step size in response to a control signal which is representative of the difference between a target value for the number of bits to be produced by the step of encoding and the number of bits produced by the step of encoding, the controlling being performed by a proportionally integrating control circuit having a proportional control branch having a first control factor for determining a first fraction of the step size and an integrating control branch having a second control factor for determining a second fraction of the step size;

controlling at least one of said first and second control factors in proportion to the quotient of the average step size with which a plurality of sub-pictures is quantized and the number of bits produced by the encoding step for said plurality of sub-pictures.

5. The method as claimed in claim 4, further comprising the steps of:

precoding an applied picture; and distributing the target value for a picture in a plurality of local target values for each sub-picture such that the target value is distributed in proportion to the number of bits generated by the step of precoding for each sub-picture.

6. The method as claimed in claim 5, further including the steps of:

forming a series of quantization-dependent the and a series of quantization-independent bits for each sub-picture; and wherein the step of distributing distributes the target value among the sub-pictures in proportion to the number of quantization-dependent bits generated for said sub-pictures by the step of precoding.

* * * * *